(12) United States Patent
Dempsey et al.

(10) Patent No.: US 6,925,839 B2
(45) Date of Patent: Aug. 9, 2005

(54) METHOD FOR MAKING CAPILLARY SPLICE

(75) Inventors: Hoa Dempsey, Corning, NY (US); James G. Fagan, Corning, NY (US); William J. Miller, Horseheads, NY (US); Stephen R. Ormbsy, Painted Post, NY (US); Terry L. Taft, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 483 days.

(21) Appl. No.: 10/185,936

(22) Filed: Jun. 28, 2002

(65) Prior Publication Data

US 2004/0000167 A1 Jan. 1, 2004

(51) Int. Cl.[7] .............................................. C03B 23/08
(52) U.S. Cl. ........................ 65/29.14; 65/108; 65/109; 65/110
(58) Field of Search ............................. 65/29.11, 29.14, 65/109, 110, 29.18, 158, 160, 161, 108, 406–407; 385/95, 96, 98

(56) References Cited

U.S. PATENT DOCUMENTS

| 2,711,055 | A | * | 6/1955 | Jones et al. ................... 65/110 |
| 2,735,230 | A | * | 2/1956 | Morrill, Jr. .................... 65/55 |
| 2,790,994 | A | * | 5/1957 | Cardot et al. ................. 264/525 |
| 3,625,248 | A | | 12/1971 | Loxley et al. ................. 65/108 |
| 3,897,233 | A | | 7/1975 | Szilagyi ........................ 65/109 |
| 4,257,674 | A | | 3/1981 | Griffin et al. ............. 350/96.21 |
| 4,372,773 | A | * | 2/1983 | Halasz ........................ 65/108 |
| 4,525,192 | A | | 6/1985 | Booms ........................ 65/110 |
| 4,822,389 | A | | 4/1989 | Berkey .......................... 65/2 |
| 4,891,555 | A | * | 1/1990 | Ahlgren et al. ............. 313/634 |
| 4,917,718 | A | | 4/1990 | Berkey ........................ 65/108 |
| 4,919,510 | A | | 4/1990 | Hoke et al. ............... 350/96.21 |
| 4,931,120 | A | | 6/1990 | Christoff ..................... 156/153 |
| 4,932,740 | A | * | 6/1990 | Berkey et al. ................ 385/43 |
| 5,152,816 | A | * | 10/1992 | Berkey ........................ 65/429 |
| 6,546,752 | B2 | * | 4/2003 | Sulcs et al. .................. 65/60.4 |
| 6,557,379 | B1 | * | 5/2003 | Nagasawa et al. ......... 65/29.12 |
| 6,766,662 | B2 | * | 7/2004 | Morishita et al. ............ 65/110 |
| 2001/0036339 | A1 | * | 11/2001 | Morishita et al. ............. 385/70 |

* cited by examiner

*Primary Examiner*—Steven P. Griffin
*Assistant Examiner*—Carlos Lopez
(74) *Attorney, Agent, or Firm*—Timothy M. Schaeberle

(57) ABSTRACT

A method of making a capillary splice includes applying pressure to a bore in a tube, applying heat to a portion of the tube to soften the portion of the tube, and forming a bubble within the bore in the heated portion under the influence of the pressure and heat. While forming the bubble, a diameter of the bore at the heated portion is measured to determine when the bubble has enlarged to a target size. When the bubble has enlarged to the target size, a force is applied along an axial axis of the tube to shape the bubble to a desired size.

9 Claims, 10 Drawing Sheets

METHOD FOR MAKING CAPILLARY SPLICE

BACKGROUND OF THE INVENTION

1. Field of the Invention

The invention relates generally to devices for aligning and coupling optical fibers. More specifically, the invention relates to a method and an apparatus for making a capillary splice.

2. Background Art

Fiber-optic systems require means for transferring energy from one optical fiber to another without undue power loss. One method for transferring energy from one optical fiber to another involves positioning the optical fibers in an end-to-end relationship so that light emanating from one fiber end face is directed into the adjacent fiber end face.

Capillary splices can be used to align sets of optical fibers in an end-to-end relationship. FIG. 1 shows a cross-section of a capillary splice 1, which includes a capillary tube 2 having a longitudinal bore 3. Terminal ends of optical fibers 4, 5 are inserted into the bore 3 to place the optical fibers 4, 5 in an end-to-end relationship. It is usually desirable to make the diameter of the bore 3 only a few microns larger than the diameter of the optical fibers 4, 5 so that the optical axes of the optical fibers 4, 5 remain substantially aligned when inserted into the bore 3. Funnel-like apertures 6, 7 are formed at the ends of the bore 3 to facilitate insertion of the optical fibers 4, 5 into the bore 3. The funnel-like apertures 6, 7 also provide a mounting location for bonding material 8, 9, which is used to secure the optical fibers 4, 5 to the capillary tube 2. In general, one or both ends of the bore 3 may be terminated with a funnel-like aperture.

It is important that the capillary splice is manufactured with extreme precision to avoid undue power loss when coupling light between the optical fibers. U.S. Pat. No. 4,822,389, issued to Berkey, discloses a method for making a capillary splice. The method involves placing the bore of a capillary glass tube under pressure by filling the bore with a fluid, such as air, nitrogen, and the like, and then applying localized heat to the capillary glass tube. As the glass tube is heated to its softening point, the inside wall of the bore starts to expand within the softened area by the pressure of the fluid within the bore. The pressure of the fluid causes a bubble to form within the glass tube.

FIG. 2A shows a bubble 10a forming within a glass tube 11 as the bore 12 of the glass tube 11 is pressurized with fluid 13 and the glass tube 11 is heated locally to its softening point by a burner 14. The glass tube 11 is rotated as it is heated to allow for uniform heat distribution across the glass tube 11. As the glass tube 11 is rotated and subjected to localized heating, the bubble 10a continues to expand until it occupies a major portion of the diameter of the glass tube 11. FIG. 2B shows the bubble 10a occupying a major portion of the diameter of the glass tube 11. After forming the bubble 10a, the glass tube 11 may be stretched (or pulled) along its axial axis to size the bubble 10a to a desired length and diameter. FIG. 2C shows another bubble 10b formed within the glass tube 11 using the process just described. The bubble 10b is spaced a desired distance from the bubble 10a. To form the capillary splice, the glass tube 11 is scored along its exterior surface at about the center of each of the bubbles 10a, 10b. Thereafter, the glass tube 11 is severed along the score lines to produce the capillary splice.

Forming a capillary splice that meets desired specifications requires careful control and coordination of the amount of pressure inside the glass tube, the amount of heat applied to the glass tube, where the heat is applied to the glass tube, the orientation of the glass tube while the bubble is being formed, and the amount of pull applied to the glass tube after forming the bubble. The amount of pull applied to the glass tube would depend on the size of the bubble achieved after applying pressure and heat to the glass tube and the desired length and diameter of the bubble. Controlling and coordinating these process parameters manually to achieve bubbles that meet desired specifications is very difficult. Measurements would have to be made after each bubble is formed to determine needed process parameters. In some cases, these measurements would have to be performed manually, with the results varying from one operator to another.

BRIEF SUMMARY OF INVENTION

In one aspect, the invention relates to a method of making a capillary splice which comprises applying pressure to a bore in a tube, applying heat to a portion of the tube to soften the portion of the tube, and forming a bubble within the bore in the heated portion under the influence of the pressure and heat. While forming the bubble, a diameter of the bore at the heated portion is measured to determine when the bubble has enlarged to a target size. When the bubble has enlarged to the target size, a force is applied along an axial axis of the tube to shape the bubble to a desired size.

In another aspect, the invention relates to an automated system for making a capillary splice which comprises a pressure system that controls pressure in a bore of a tube to a predetermined level, a heating system that applies localized heat to the tube, a motion system operable to apply a force along an axial axis of the tube, and a vision system that initiates the motion system to apply the force to the tube based on a desired size of a bubble formed within the bore.

In another aspect, the invention relates to an apparatus for making a capillary splice which comprises means for applying a predetermined pressure to a bore in a tube, means for locally heating the tube, means for capturing an image of the portion of the tube, means for deducing a diameter of the bore from the image of the bore, and means for applying a force along an axial axis of the tube.

Other features and advantages of the invention will be apparent from the following description and the appended claims.

DETAILED DESCRIPTION OF THE INVENTION

Embodiments of the invention provide an automated method and system for making a capillary splice. The method involves forming a bubble within the bore of a capillary tube under the influence of pressure and heat. The system visually monitors a diameter of the bore as the bubble is formed to determine when the bubble has enlarged to a target size. When the bubble reaches the target size, the system applies a force along the longitudinal axis of the capillary tube to make the desired bubble length and diameter. The process is repeatable, allowing multiple bubbles of desired lengths and diameters to be formed along the length of the capillary tube. The system uses precision devices to accurately position the bubbles along the length of the capillary tube. While forming the bubble, the system ensures that the axial axis of the formed bubble is aligned (or substantially aligned) with the axial axis of the capillary tube.

Figure 1:
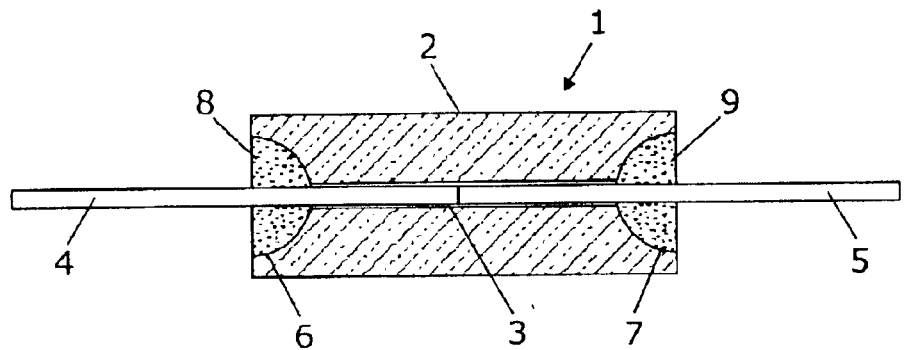
FIG. 1 shows a cross-section of a prior-art capillary splice.
Figure 2A:
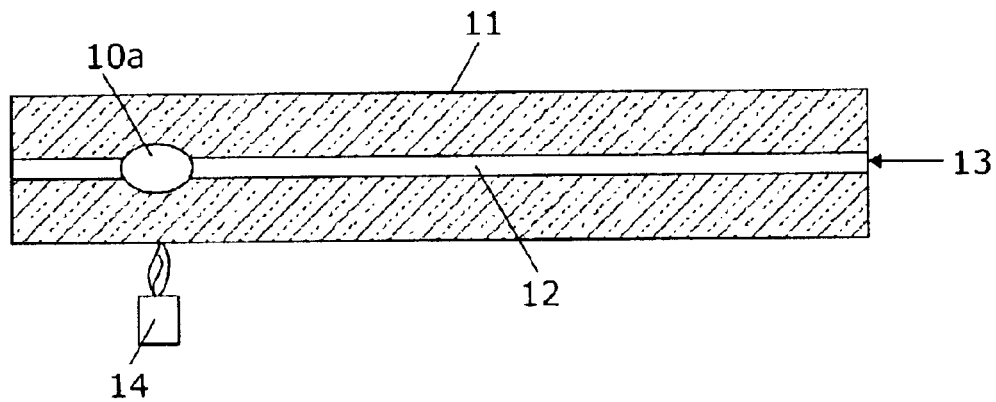
FIG. 2A shows a bubble being formed within a glass tube using a prior art method.
Figure 2B:
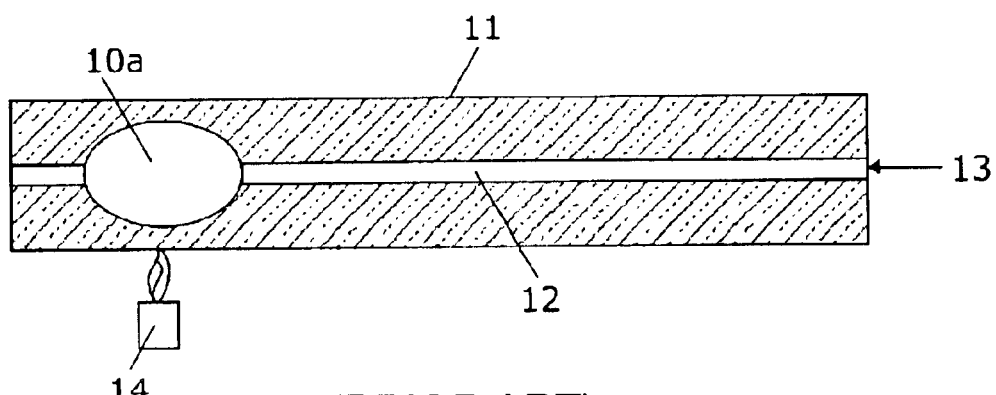
FIG. 2B shows a bubble occupying a major portion of the diameter of the glass tube shown in FIG. 2A.
Figure 2C:
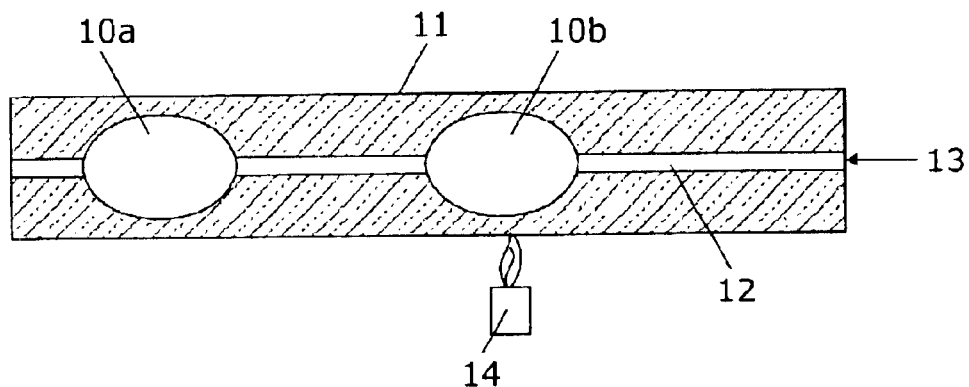
FIG. 2C shows two bubbles formed within the glass tube shown in FIG. 2A.
Figure 3:
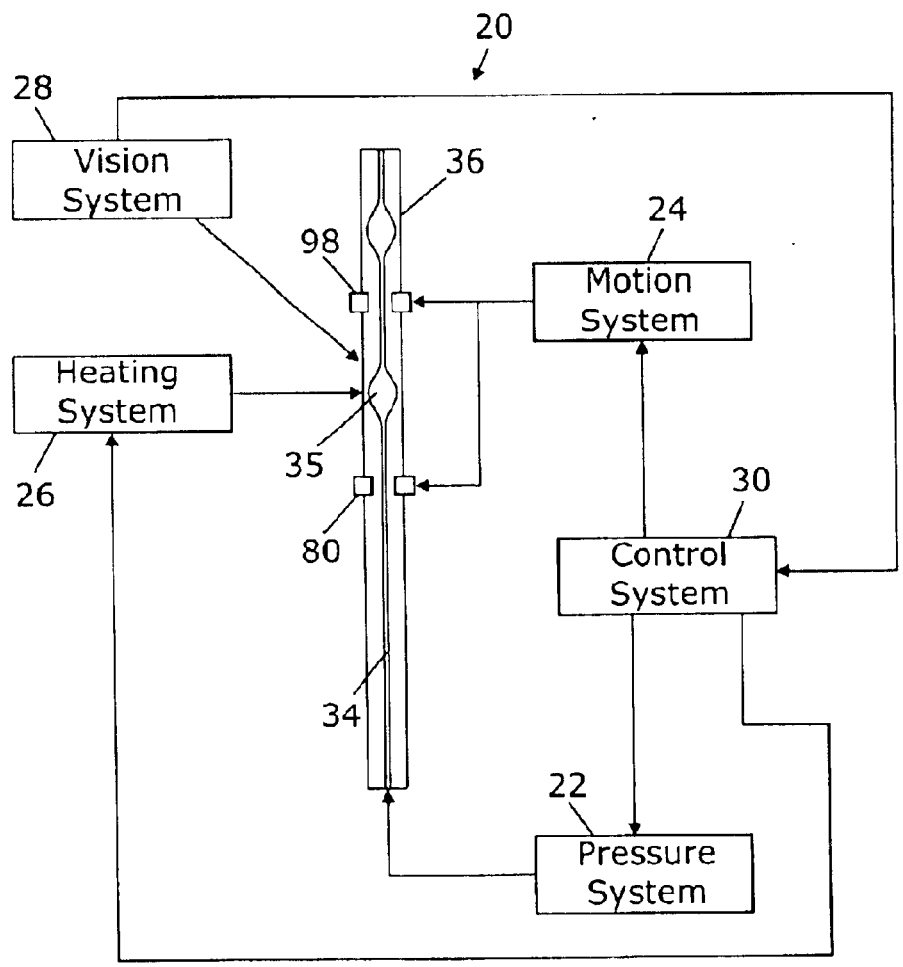
FIG. 3 shows a block diagram of an automated system for making capillary splices according to one embodiment of the invention.

FIG. 3 schematically shows an automated system 20 for making capillary splices according to an embodiment of the invention. The automated system 20 includes a pressure system 22, a motion system 24, a heating system 26, a vision system 28, and a control system 30. The pressure system 22 is responsible for pressurizing the bore 34 of a capillary tube 36 and for controlling the pressure of the bore 34 to preset values. The motion system 24 is responsible for suspending the capillary tube 36, applying a pulling force to the capillary tube 36, and adjusting the position and orientation of the capillary tube 36. The heating system 26 is responsible for applying heat to a selected region of the capillary tube 36. The vision system 28 is responsible for measuring the diameter of the bore 34 prior to and during growth of bubbles, e.g., bubble 35. The vision system 28 initiates the motion system 24 to apply a pulling force to the capillary tube 36 when the measured diameter of the bore 34 (or bubble) has reached a target size. The control system 30 is responsible for coordinating the activities of all the systems.

Specific embodiments of the invention will now be described with reference to the accompanying drawings. In the following description, numerous details are set forth to facilitate understanding of the invention. In some cases, details are omitted to avoid obscuring the invention. However, any omitted details are within the ambit of one of ordinary skill in the art.

Capillary Tube

Figure 4A:
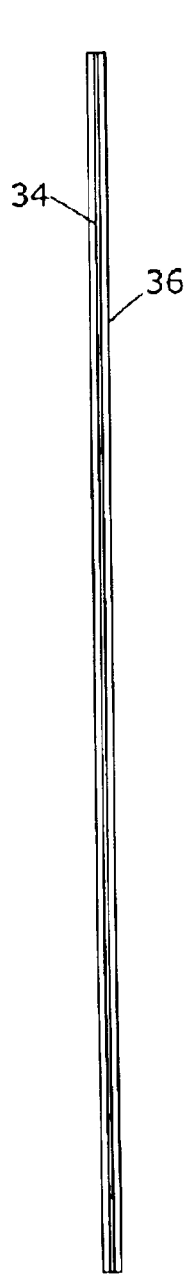
FIG. 4A shows a capillary tube for making capillary splices.

FIG. 4A shows the capillary tube 36 (see FIG. 3) prior to starting the process of forming bubbles within the capillary tube 36. The capillary tube 36 is shown as having a single bore 34. Depending on the application requirements, a capillary tube having one or multiple bores may be used in the invention. Therefore, the invention is not limited to a capillary tube having a single bore. Typically, the diameter of the bore 34 would be only a few microns larger than the outer diameter of the fibers (not shown) to be inserted into the bore 34, e.g., 0.1 to 10 microns larger. The material used in making the capillary tube 36 could be a glass material, such as fused silica. However, other materials such as ceramic, glass-ceramic, and polymeric material may also be used. In general, the material used must soften with heat to allow bubble formation. In general, the material for making the capillary tube 36 will depend on the application requirements. Capillary glass tube can be made by draw tubing techniques, such as disclosed in U.S. Pat. No. 3,652,248 issued to Loxley et al. and U.S. Pat. No. 4,917,718 issued to Berkey, as well as by other methods.

Figure 4B:
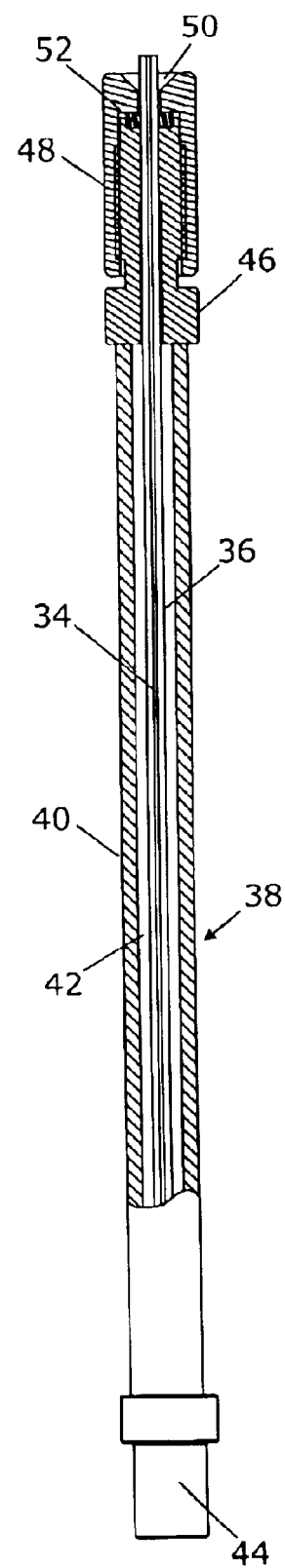
FIG. 4B shows a capillary tube disposed in a pressure tube assembly according to one embodiment of the invention.

FIG. 4B shows the capillary tube 36 disposed within a pressure tube assembly 38. The pressure tube assembly 38 facilitates handling of the capillary tube 36. The pressure tube assembly 38 is also used to feed fluid into the bore 34 of the capillary tube 36. The pressure tube assembly 38 includes a tube housing 40 having a cavity 42 for receiving the capillary tube 36. The lower end of the tube housing 40 includes an adapter 44 for connection with a fluid line (not shown). Fluid can be supplied into the cavity 42 through the adapter 44 to pressurize the bore 34. Typically, the fluid supplied into the cavity 42 is an inert gas, such as nitrogen or argon. However, other types of fluids, e.g., air, can also be used. The bore 34 opens into the cavity 42 so that the fluid supplied into the cavity 42 flows into the bore 34. The upper end of the tube housing 40 includes an adapter 46. An end cap 48 is attached to the adapter 46. The end cap 48 has an aperture 50 through which the capillary tube 36 can be drawn out of the cavity 42 to allow bubbles to be formed in the capillary tube 36. A seal 52 seals around the capillary tube 36 as the capillary tube 36 is drawn out of the cavity 42.

Pressure System

Returning to FIG. 3, the method of the invention involves placing the bore 34 of the capillary tube 36 under pressure while applying heat to the capillary tube 36. During the bubble growth process, the pressure system 22 is used to maintain a pressure in the bore 34 that is higher than the pressure surrounding the region of the capillary tube 36 where the heat is being applied. The pressure system 22 controls the pressure in the bore 34 to a level necessary to apply a desired force on the inner wall of the heated region of the capillary tube 36. The force applied on the inner wall of the capillary tube 36 is coordinated with the heat applied to the capillary tube 36 to achieve a bubble of desired size at the heated region of the capillary tube 36.

Figure 5:
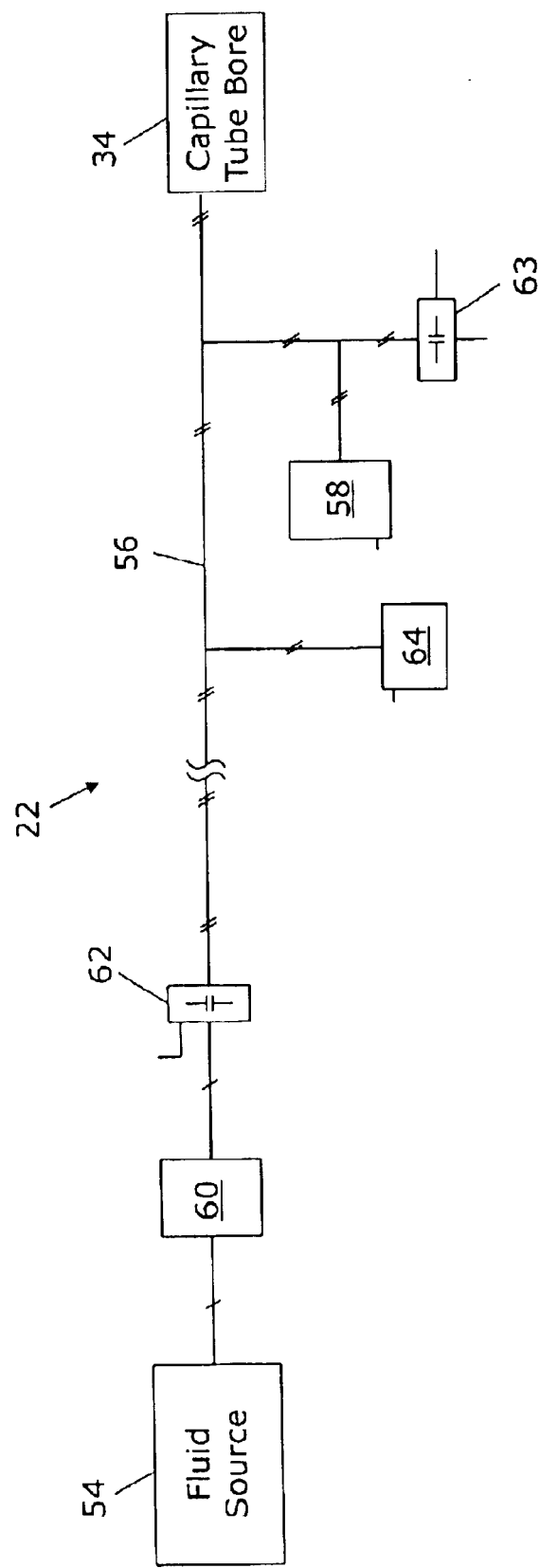
FIG. 5 shows one embodiment of a pressure system for maintaining a desired pressure level in a bore of a capillary tube.

FIG. 5 shows a schematic of one embodiment of the pressure system 22. The pressure system 22 includes a fluid source 54, a network of fluid lines 56 for transporting fluid from the fluid source 54 to the capillary tube bore 34, and valves 58, 60 for controlling the pressure in the capillary tube bore 34 to predetermined levels. The pressure in the capillary tube bore 34 is controlled by using the valve 58 to bleed pressure off the system in a controlled manner and/or using the valve 60 to supply fluid to the system in a controlled manner. A valve 62 may be provided for shutting off fluid supply to the system as necessary, and a valve 63 may be provided for venting off pressure from the system as necessary. A pressure transducer 64 is used to monitor the difference in pressure between the capillary tube bore 34 and the external atmosphere. The differential pressure is controlled to achieve a desired expansion force within the capillary tube bore 34.

Motion System

Returning to FIG. 3, the method of the invention involves ensuring that the capillary tube 36 is properly oriented while forming a bubble in the capillary tube 36. In other words, the portion of the capillary tube 36 where the bubble will be formed should be straight. This would ensure that the formed bubble does not have kinks or twists, i.e., that the axial axis of the bubble is generally aligned with the axial axis of the capillary axis 36. The method of the invention also involves applying a pulling force along the axial axis of the capillary tube 36. The pulling force is applied after the measured diameter of the bore 34 (or formed bubble) has reached a target size. This target size is selected based on the desired final diameter and length of the bubble being formed within the bore 34.

The motion system 24 performs the functions described above, i.e., maintaining the capillary tube 36 in a proper orientation while forming the bubble 35 and applying a pulling force to the capillary tube 36 when the measured diameter of the bore 34 (or bubble 35) has reached a target size. The motion system 24 also adjusts the position of the capillary tube 36 so that multiple bubbles can be formed along the length of the capillary tube 36. The motion system 24 can also rotate the capillary tube 36.

Figure 6:
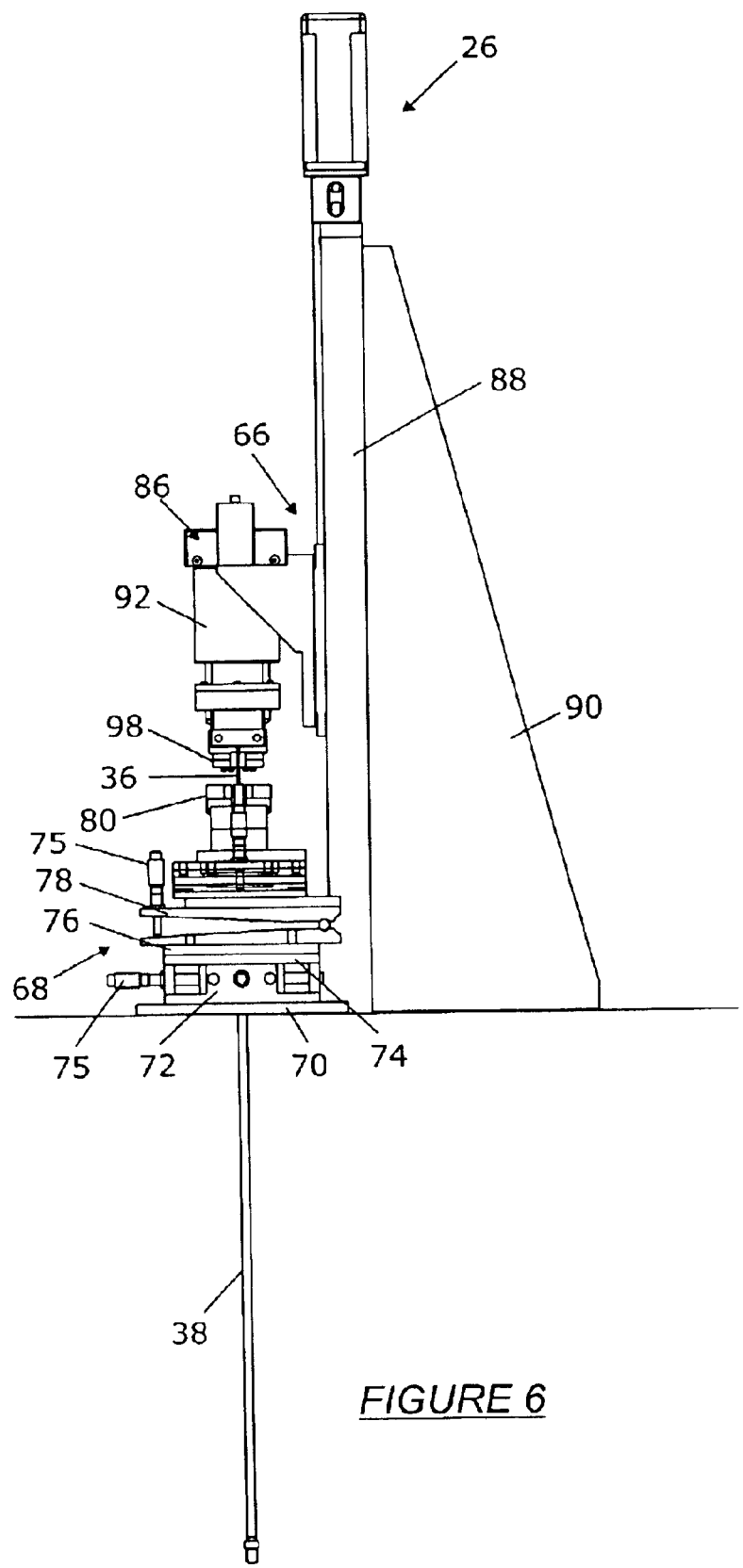
FIG. 6 shows one embodiment of a motion system for applying a pulling force on a capillary tube and adjusting the position and orientation of the capillary tube.

FIG. 6 shows one embodiment of the motion system 24. The motion system 24 includes a top motion assembly 66 and a bottom motion assembly 68. The bottom motion assembly 68 supports the pressure tube assembly 38, which holds the capillary tube 36. The top motion assembly 66 can engage the capillary tube 36 and move the capillary tube 36 vertically relative to the bottom motion assembly 68 as well as rotate the capillary tube 36. The bottom motion assembly 68 performs other functions besides supporting the pressure tube assembly 38, such as adjusting the orientation of the capillary tube 36 so that a bubble is accurately positioned within the capillary tube 36. The bottom motion assembly 68 cooperates with the top motion assembly 66 to apply a pulling force along the longitudinal axis of the capillary tube 36.

Figure 7:
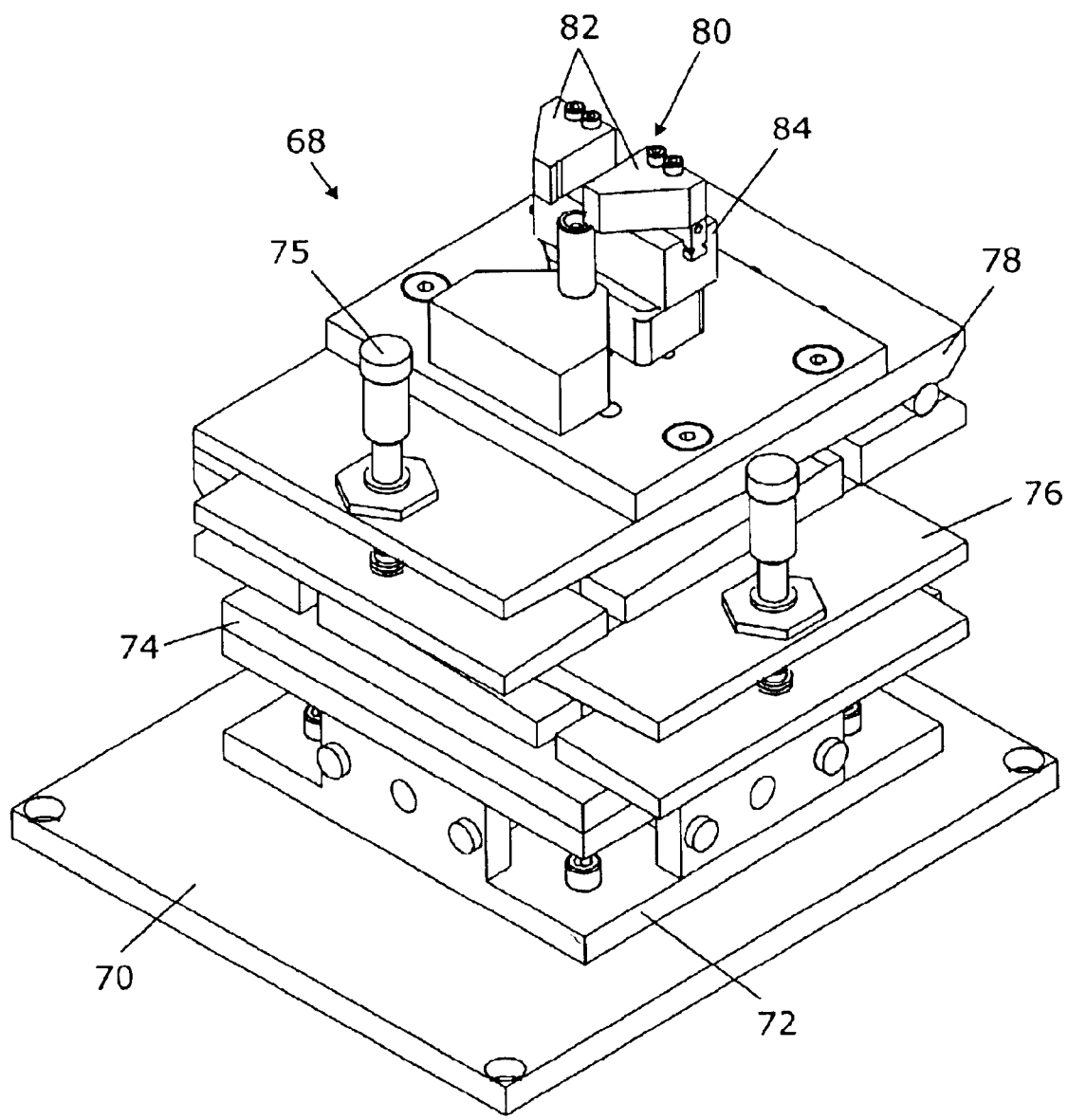
FIG. 7 shows a perspective view of the bottom motion assembly shown in FIG. 6.

FIG. 7 shows a perspective view of the bottom motion assembly 68. The bottom motion assembly 68 includes a base plate 70. A first linear translation stage 72 is mounted on the base plate 70. A second linear translation stage 74 is mounted on the first linear translation stage 72. The axis of motion of the second linear stage 74 is oriented at 90 degrees to that of the first linear stage 72. A single-axis tilt platform 76 is mounted on the second linear x-y translation stage 74. A second single axis tilt platform 78 oriented at 90 degrees to the first one 76 is mounted on the first single axis tilt platform 76. Note that compound stages with multiple axes can be substituted for the individual stages described above. Micrometer adjustments 75 on the translation stages 72, 74 and the single-axis tilt platforms 76, 78 allow for incremental micron scale adjustment of the orientation of the capillary tube (36 in FIG. 6). The translation stages 72, 74 allow full linear positioning of the capillary tube (36 in FIG. 6) in the horizontal plane, while the single-axis tilt platforms 76, 78 allow full angular adjustment of the capillary tube (36 in FIG. 6). Typically, it is desirable that the lower grippers 82 are aligned to the upper grippers 98 such that the upper and lower portions of the capillary tube (36 in FIG. 6) are coaxial while the bubble is being formed.

A lower gripper device 80 is mounted on the second single-axis tilt platform 78. The lower gripper device 80 includes a pair of gripping jaws 82 which are movable by a pneumatic slide 84. The gripping jaws 82 are actuated to engage the capillary tube (36 in FIG. 6). A passageway (not shown) runs through the base plate 70, the linear translation stages 72, 74, and the single-axis tilt platforms 76, 78. Returning to FIG. 6, the pressure tube assembly 38 is inserted in the passageway (not shown) running through the bottom motion assembly 68, and the lower gripper device 80 is actuated to engage the pressure tube assembly 38 such that the pressure tube assembly 38 is suspended in a vertical position. In this position, the micrometer adjustments 75 on the linear translation stages 72, 74 and the single-axis tilt platforms 76, 78 can be operated to adjust the orientation of the capillary tube 36.

Figure 8:
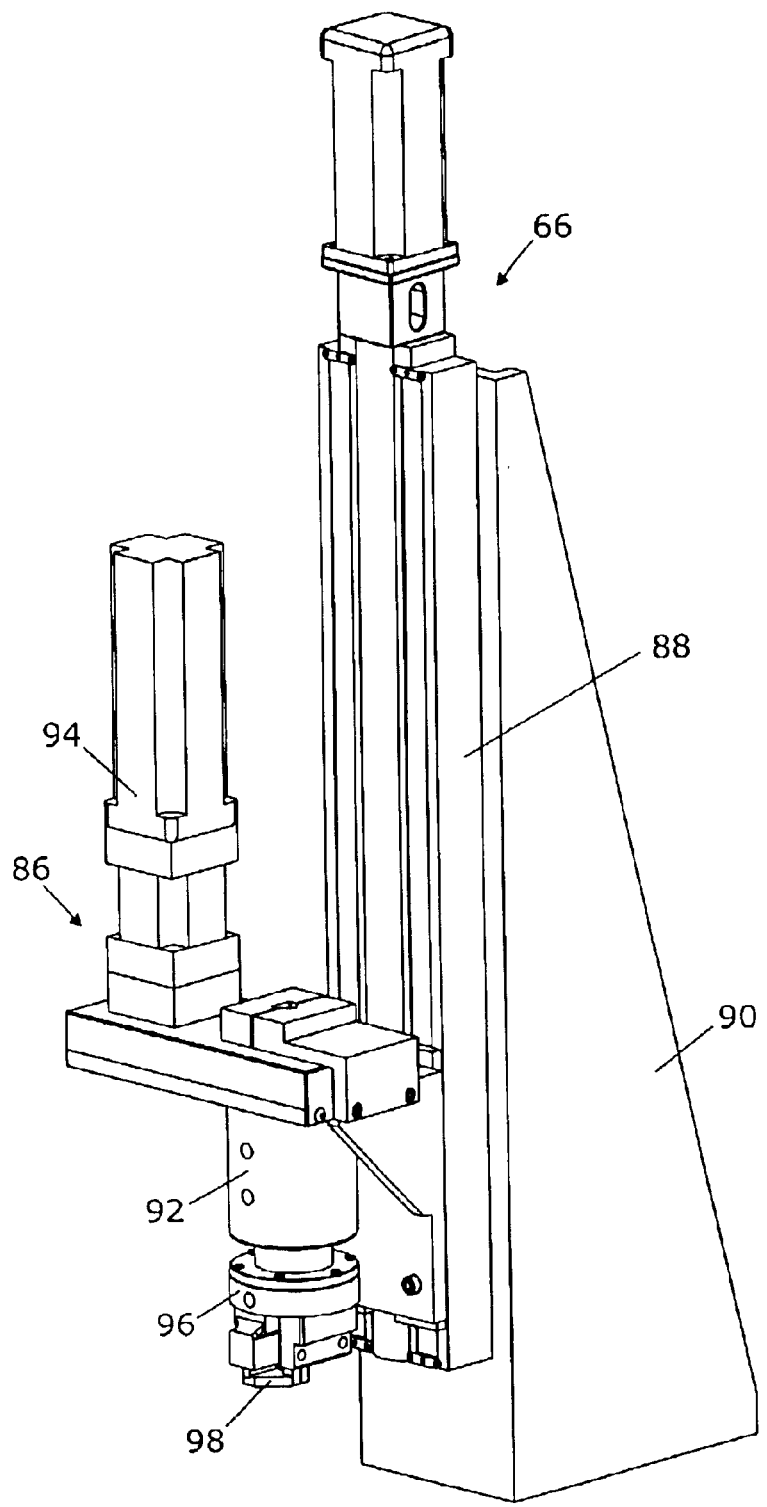
FIG. 8 shows a perspective view of the top motion assembly shown in FIG. 6.

FIG. 8 shows a perspective view of the top motion assembly 66. The top motion assembly 66 includes a tool assembly 86 coupled to a precision linear drive 88, such as a linear screw drive. The purpose of the precision linear drive 88 is to adjust the vertical position of the tool assembly 86. Therefore, any drive mechanism that can be used to achieve this purpose can be used. A mounting bracket 90 is used to support the precision linear drive 88. The tool assembly 86 includes a rotary union 92, which can be driven by a servo motor 94 or other suitable mechanism. A manifold 96 is attached to the bottom of the rotary union 92. An upper gripper device 98, similar to the lower gripper device (80 in FIG. 7), is attached to the manifold 96. Although not shown, a tube guide is inserted inside the rotary union 92. The tube guide includes an aperture through which the capillary tube (36 in FIG. 6) can be inserted into and through the rotary union 92. The purpose of the rotary union 92 is to rotate the capillary tube (36 in FIG. 6) as needed. For example, the capillary tube (36 in FIG. 6) may be rotated so that two bores appear as a single bore to the vision system (28 in FIG. 3).

Returning to FIG. 6, before forming a bubble in the capillary tube 36, the position and orientation of the capillary tube 36 is adjusted as necessary to allow the bubble to be positioned accurately within the capillary tube 36. In the figure, the capillary tube assembly 36 is engaged by the pressure tube assembly 38, and an upper end of the capillary tube 36 extends out of the pressure tube assembly 38 and is engaged by the upper gripper device 98. In this position, the precision linear drive 88 can be operated to move the tool assembly 86 such that the capillary tube 36 is drawn out of the pressure tube assembly 38. The micrometer adjustments 75 on translation stages 72, 74 and the single-axis tilt platforms 76, 78 can be operated to adjust the orientation of the capillary tube 36 such that the portion of the capillary tube 36 between the gripper devices 80, 98 is straight.

If it is desired to rotate the capillary tube 36, the lower gripper device 80 is operated to disengage the capillary tube 36 while the upper gripper device 98 holds on to the capillary tube 36. Then, the rotary union 92 is driven to rotate the capillary tube 36 through a predetermined angle. After rotation, the lower gripper device 80 is again operated to engage capillary tube 36.

It should be noted that the invention is not limited to suspending the capillary tube 36 vertically. The motion system 24 could be modified such that the capillary tube 36 is suspended horizontally, for example.

Heating System

Returning to FIG. 3, the method of the invention involves heating the capillary tube 36 to its softening point so that the pressure applied to the bore 34 of the capillary tube 36 can expand the inner wall of the capillary tube 36. The heating system 26 is responsible for applying heat to the capillary tube 36. Various types of heating systems can be used, such as gas burners, induction heaters, or resistance heaters.

Figure 9:
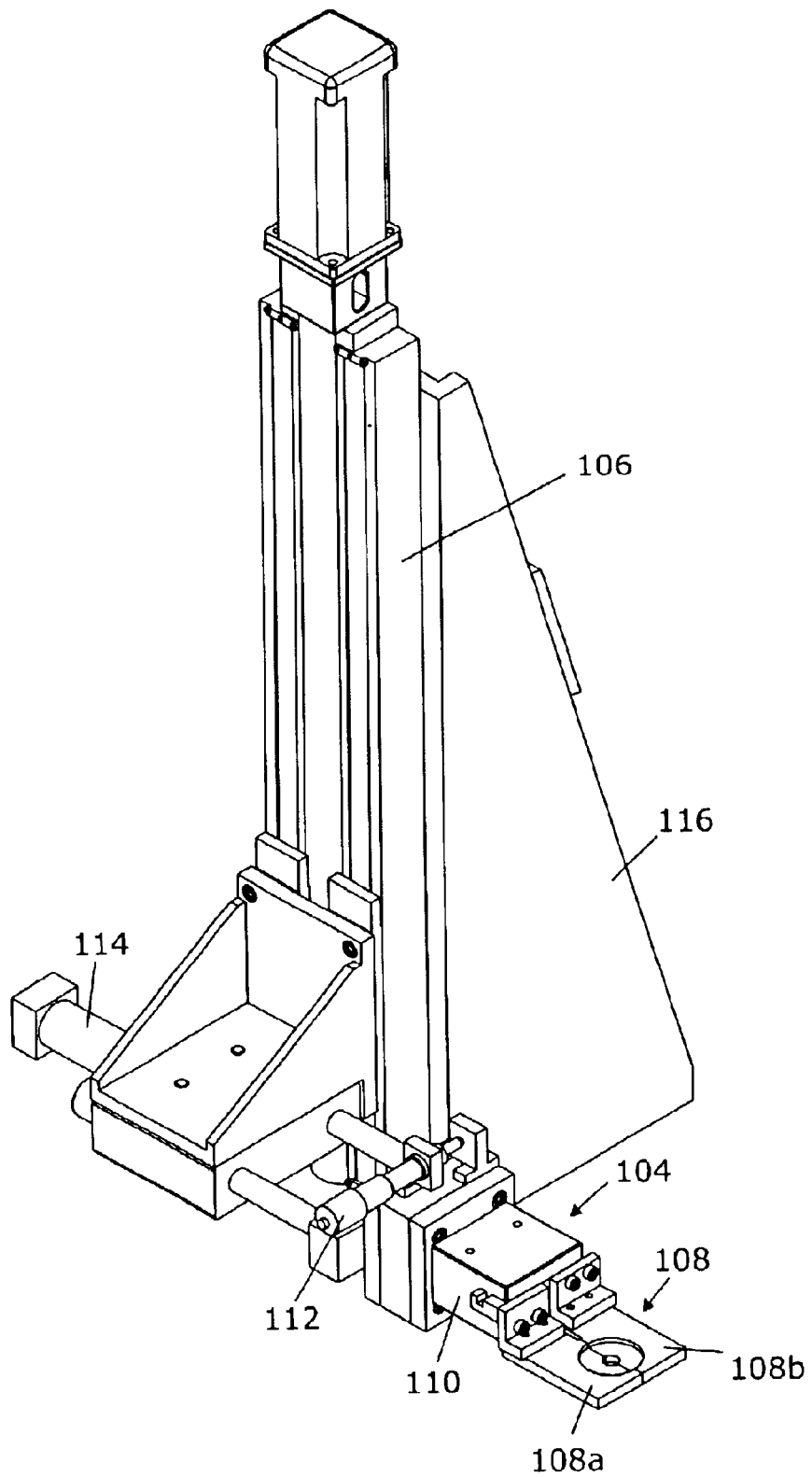
FIG. 9 shows one embodiment of a heating system for applying heat to a selected region of a capillary tube.

FIG. 9 shows one embodiment of the heating system 26. The heating system 26 includes a burner assembly 104 coupled to a precision linear drive 106, such as a linear screw drive. The purpose of the precision linear drive 106 is to adjust the vertical position of the burner assembly 104 to correspond with the vertical position of the portion of the capillary tube (36 in FIG. 6) to be heated. Any drive mechanism that can be used to achieve this purpose can be used. A mounting bracket 116 is attached to the precision linear drive 106. The burner assembly 104 includes an annular split ring burner 108. The burner halves 108a, 108b can be moved toward each other or away from each other using a pneumatic slide 110. The pneumatic slide 110 and burner 108 are mounted on a translation stage 112 so that the horizontal position of the burner 108 can be adjusted. A pneumatic actuator 114 (or other suitable actuator) is provided to selectively extend and retract the burner 108. Although not shown, the heating system 26 also includes an ignition system for igniting the burner 108.

In operation, the burner halves 108a, 108b are moved apart and then extended to the region of the capillary tube (36 in FIG. 6) to be heated. The burner halves 108a, 108b are later moved toward each other to form an annulus around the capillary tube (36 in FIG. 6). A gas mixture, such as oxygen-methane or oxygen-hydrogen mixture, is supplied to the burner 108 to achieve a desired flame temperature which will heat the capillary tube (36 in FIG. 6). As previously mentioned, the invention is not limited to use of a gas burner to heat the capillary tube. Other means of heating, such as resistance heating and induction heating, can also be used. If an annular burner is not used, it may be desirable to rotate the capillary tube (36 in FIG. 6) during the heating process so that heat is uniformly applied across the diameter of the capillary tube (36 in FIG. 6). The rotary union (92 in FIG. 6) may be used to rotate the capillary tube (36 in FIG. 6).

Vision System

Returning to FIG. 3, the method of the invention involves continuously measuring the diameter of the bore 34 prior to and during formation of a bubble, e.g., bubble 35, within the capillary tube 36. The measurements made are used to determine when to apply a pulling force to the capillary tube 36 and how much pulling force to apply. The vision system 28 is responsible for monitoring and measuring the diameter of the bore 34. The vision system 28 correlates the measured diameter of the bore 34 to the size of the formed bubble. In addition to monitoring the diameter of the bore 34, the vision system 28 also aids in adjusting the orientation of the capillary tube 36 so that bubbles are accurately positioned within the bore 34 of the capillary tube 36.

Figure 10:
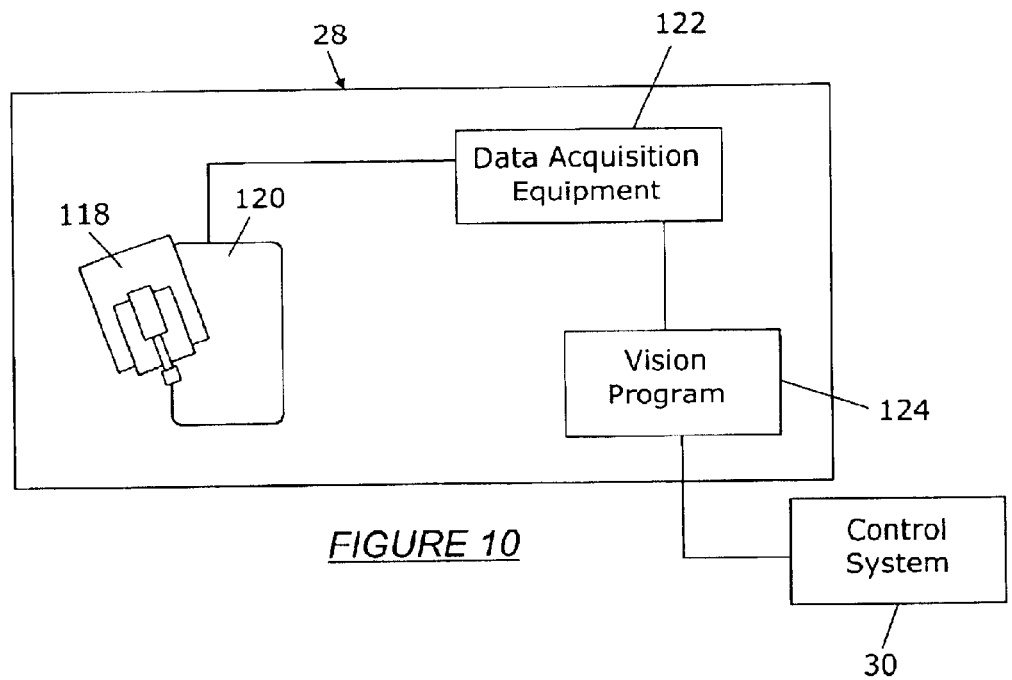
FIG. 10 shows one embodiment of a vision system for monitoring an inner diameter of a capillary tube.

FIG. 10 shows one embodiment of the vision system 28. As shown, the vision system 28 includes a camera 118 on a camera mounting base 120. The camera 118 captures images of the capillary tube (36 in FIG. 3) and transmits the images to data acquisition equipment 122. The data acquisition equipment 122 includes a program which preprocesses the image data and transfers the processed data to a vision program 124. The vision program 124 includes a set of routines for deducing the measured diameter of the bore (34 in FIG. 3) from the image data. The image data may be represented as pixels. In one embodiment, deducing the measured diameter of the bore (34 in FIG. 3) involves counting the pixels in the image which correspond to the measured diameter of the bore (34 in FIG. 3). Other methods of deducing the measured diameter from image data can also be used.

The vision system 28 continually monitors the bore (34 in FIG. 3) before and during the bubble growth process. When the measured diameter of the bore (34 in FIG. 3) has reached a target size, the vision system 28 sends a signal to the control system 30, which then initiates the motion system (24 in FIG. 3) to apply a pulling force to the capillary tube (36 in FIG. 3).

It should be noted that the invention is not limited to use of a camera in monitoring bubble growth inside the capillary tube (36 in FIG. 3). Other sensing means, such as laser scanning, can also be used to monitor bubble growth inside the capillary tube (36 in FIG. 3).

Apparatus for Making Capillary Splice

Figure 11A:
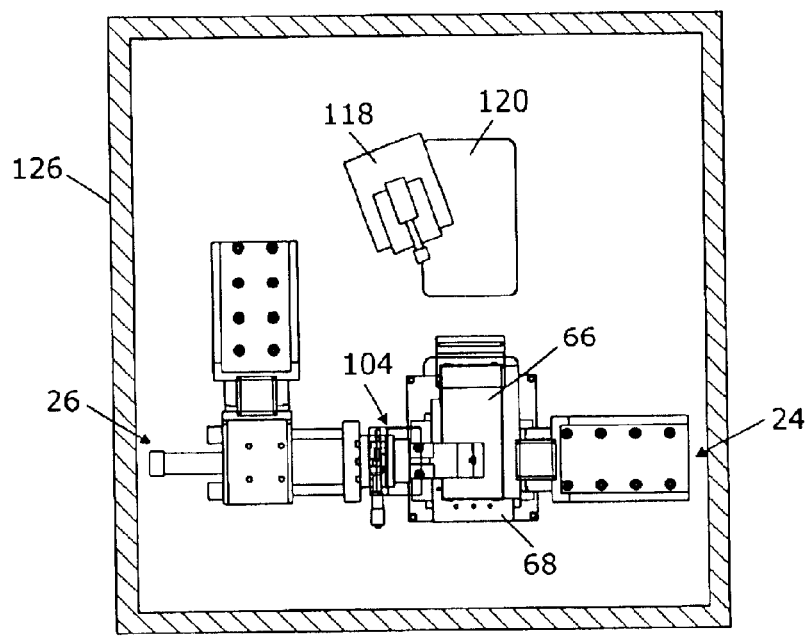
FIG. 11A shows a top view of an apparatus for making capillary splices according to one embodiment of the invention.
Figure 11B:
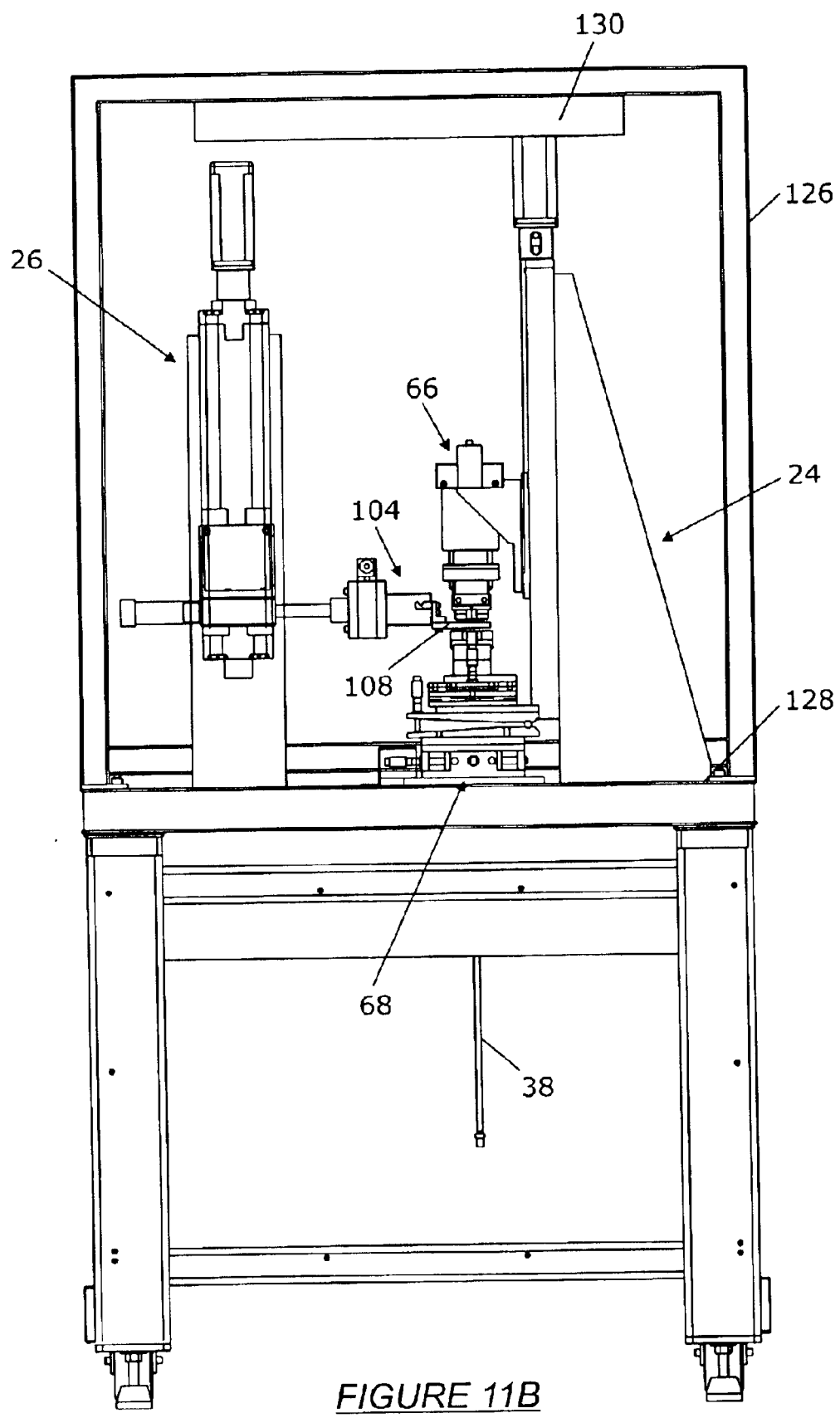
FIG. 11B shows a front view of an apparatus for making capillary splices according to one embodiment of the invention.

FIG. 11A shows a top view of the apparatus for making capillary splice according to one embodiment of the invention. The camera 118, the burner assembly 104, top motion assembly 66, and the bottom motion assembly 68 are mounted within an enclosure frame 126. FIG. 11B shows a front view of the apparatus for making capillary splice. The heating system 26 and motion system 24 are mounted on a worktable 128, within the enclosure frame 126. The pressure tube assembly 38 is suspended by the bottom motion assembly 68. The pressure tube assembly 38 extends below the worktable 128 through an aperture (not shown) in the worktable 128. The annular burner 108 is in an extended position and circumscribes the capillary tube (not visible in the drawing). Although not shown, a fluid line would be connected to the pressure tube assembly 38 to carry pressurized fluid to the bore of the capillary tube. An overhead light 130 is mounted at the top of the enclosure frame 126 to provide the environment necessary to capture clear images of the capillary tube. It should be noted that not all the components of the apparatus are shown in FIGS. 11A and 11B.

Operation

Referring to FIG. 4B, the process for making capillary splices starts by loading the capillary tube 36 inside the pressure tube assembly 38. Referring to FIG. 6, the pressure tube assembly 38 is then inserted into a passageway in the bottom motion assembly 68. Then, the lower gripper device 80 is actuated to engage the pressure tube assembly 68. The upper gripper device 98 is then operated to engage the top of the capillary tube 36, which protrudes out of the pressure tube assembly 38. The linear precision drive 88 is actuated to move the upper gripper device 98 relative to the lower gripper device 80 so that the capillary tube 36 is placed at a desired vertical position. In one embodiment of the invention, if the capillary tube 36 has two bores, an alignment process is carried out to rotate the capillary tube 36 such that the dual bores appear as a single bore to the vision system (28 in FIG. 3). The vision system (28 in FIG. 3) aids in determining the rotational angle for the capillary tube 36.

Returning to FIG. 3, after adjusting the orientation and position of the capillary tube 36, the pressure system 22 is operated to pressurize the bore 34 of the capillary tube 36 to preset values. These preset values are provided to the control system 30, which controls operation of the pressure system 22. The burner (see 108 in FIG. 11B) included in the heating system 26 is then extended towards the capillary tube 36 (see FIG. 11B) to heat the portion of the capillary tube 36 between the gripper devices 80, 98 to the softening point of the glass. The capillary tube 36 may be rotated during the heating process.

The vision system 28 monitors the capillary tube 36 before and during the heating process. Once the measured diameter of the bore 34 has reached a target size, due to the heating and pressure in the bore 34, the vision system 28 sends a signal to the control system 30. The target size is determined based on the actual desired size bubble 35. When the control system 30 receives a signal from the vision system 28, the control system 30 triggers the motion system 24 to activate. At this point, the motion system 24 moves the gripper devices 80, 98 in a direction away from each other, applying a pulling force along a longitudinal axis of the capillary tube 36. The motion system 24 moves the gripper devices 80, 98 apart by a distance proportional to the desired length of the bubble 35. This desired length is given to the system as a parameter. As the gripper devices 80, 98 are moved apart, the bubble 35 is stretched to the desired length.

When the control system 30 receives a signal from the vision system 28, the control system 30 also triggers the pressure system 22 to release pressure from the bore 34 of the capillary tube 36. The speed at which pressure is released from the bore 34 depends on the position of the bubble being formed along the length of the capillary tube 36. Releasing pressure from the bore 34 allows greater control over the size of the bubble as the pulling force is applied to the capillary tube 36. Releasing pressure from the bore 34 also reduces the amount of pulling force needed to achieve a desired bubble size. The final diameter of the bubble 35 is determined by the amount by which the bubble 35 is stretched by the gripper devices 80, 98 and how quickly pressure is released out of the bore 34 as the bubble is stretched.

The process described above is repeated at desired intervals along the length of the capillary tube 36. This results in a capillary tube 36 with a series of bubbles formed periodically along its length. The invention eliminates the need to manually measure the length and diameter of each bubble after the bubble is formed. Instead, the vision system 28 monitors the size of the bubble as the bubble is formed. The measurements made by the vision system 28 are then used to determine when to apply a pulling force to the capillary tube 36 such that the bubble is shaped to the desired size. The bubbles are accurately positioned within the capillary tube 36 with the aid of the various positioning devices in the motion system 24. The bubble positional accuracy achieved in this process allows the ready use of slicing or scoring techniques to section the capillary tube 36 into capillary splices. The resultant capillary splices have a funnel-like aperture at one or both ends. The funnel-like aperture allows smooth transition into the bore of the capillary tube.

The invention provides one or more advantages. The bubble formation process is continuously monitored to determine when the bubble has enlarged to a target size. Once the bubble has enlarged to a target size, a motion system is activated to apply a pulling force to the bubble such that the bubble is shaped to the desired size. The automated system also coordinates the pressure in the bore of the capillary tube with the heat applied to the capillary tube so that the desired bubble size is formed within the capillary tube. The automated system also uses various positioning devices to ensure that the bubbles are accurately positioned within the capillary tube.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of making a capillary splice, comprising:

applying pressure to a bore in a tube;

applying heat to a portion of the tube to soften the portion of the tube;

forming a bubble within the bore in the heated portion under the influence of the pressure and heat;

while forming the bubble, measuring a diameter of the bore at the heated portion to determine when the bubble has enlarged to a target size; and when the bubble has enlarged to the target size, applying a force along an axial axis of the tube to shape the bubble to a desired size.

2. The method of claim 1, wherein measuring the diameter of the bore comprises capturing an image of the heated portion of the tube.

3. The method of claim 2, wherein measuring the diameter of the bore further comprises deducing the diameter of the bore from the image.

4. The method of claim 1, further comprising releasing an amount of pressure from the bore prior to applying the force.

5. The method of claim 1, wherein applying pressure to the bore comprises supplying fluid to the bore.

6. The method of claim 5, further comprising controlling the pressure in the bore to a predetermined level based on the target size of the bubble and the heat applied to the portion of the tube.

7. The method of claim 1, wherein applying the force is automatically initiated when the bubble has enlarged to the target size.

8. The method of claim 1, wherein applying the force comprises using a pair of gripping devices to engage the tube at two separate locations and moving the gripping devices apart a desired distance proportional to a desired length of the bubble.

9. The method of claim 1, further comprising maintaining alignment of an axial axis of the bubble with the axial axis of the tube while forming the bubble.

* * * * *